United States Patent [19]
Elder

[11] Patent Number: 5,878,786
[45] Date of Patent: Mar. 9, 1999

[54] OTANGULAR FITTING FAMILY FOR FLAT-OVAL DUCT SYSTEMS AND METHOD FOR MAKING SAME

[76] Inventor: William Elder, 2311 Thousand Oaks Dr., Richmond, Va. 23294

[21] Appl. No.: 715,738

[22] Filed: Sep. 19, 1996

Related U.S. Application Data

[63] Continuation of Ser. No. 532,388, Sep. 22, 1995, abandoned, which is a continuation of Ser. No. 369,281, Jan. 6, 1995, abandoned, which is a continuation of Ser. No. 81,514, Jun. 21, 1993, abandoned.

[51] Int. Cl.[6] ..................................................... F16L 9/17
[52] U.S. Cl. ......................... 138/163; 138/109; 138/117; 138/177; 138/DIG. 4; 137/875; 285/424
[58] Field of Search ..................................... 138/157, 163, 138/177, DIG. 4, DIG. 11, 117, 109; 285/31, 177, 182, 424; 137/875

[56] References Cited

U.S. PATENT DOCUMENTS

| | | | |
|---|---|---|---|
| 590,374 | 9/1897 | Osburn | 138/177 |
| 1,374,866 | 4/1921 | Spencer | 138/DIG. 4 |
| 1,881,679 | 10/1932 | Klomparens | 138/DIG. 4 |
| 2,216,864 | 10/1940 | Wasmund | 138/DIG. 4 |
| 2,359,725 | 10/1944 | Berger et al. | 138/163 |
| 2,825,431 | 3/1958 | Molt | 138/157 |
| 3,965,933 | 6/1976 | Beaudin | 138/163 |

FOREIGN PATENT DOCUMENTS

| | | | |
|---|---|---|---|
| 1015390 | 9/1957 | Germany | 138/157 |
| 2926066 | 5/1981 | Germany | 138/DIG. 11 |

OTHER PUBLICATIONS

Pipe and Duct Work, Meyer and Brothers, Jul. 1938, pp. 4–8.

*Primary Examiner*—David Scherbel
*Assistant Examiner*—James F. Hook
*Attorney, Agent, or Firm*—R. Winston Slater

[57] ABSTRACT

An apparatus for converting a conventional rectangular HVAC duct to a flat oval shaped duct where a conventional rectangular duct fitting is provided with a converting means to convert the opening from rectangular to a flat oval. The converting means is formed by a pair of arcuate members defining semi-circular edges and having recesses to receive portions of parallel members. The apparatus utilizes two sheet metal pieces which are formed in arcuate contours that connect between flat edges of parallel sheets to form the oval shape.

3 Claims, 3 Drawing Sheets

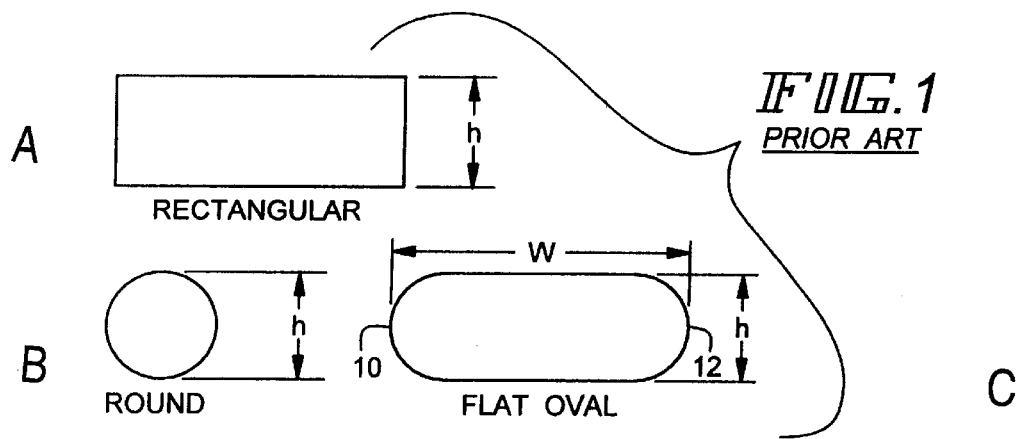
FIG. 1 PRIOR ART
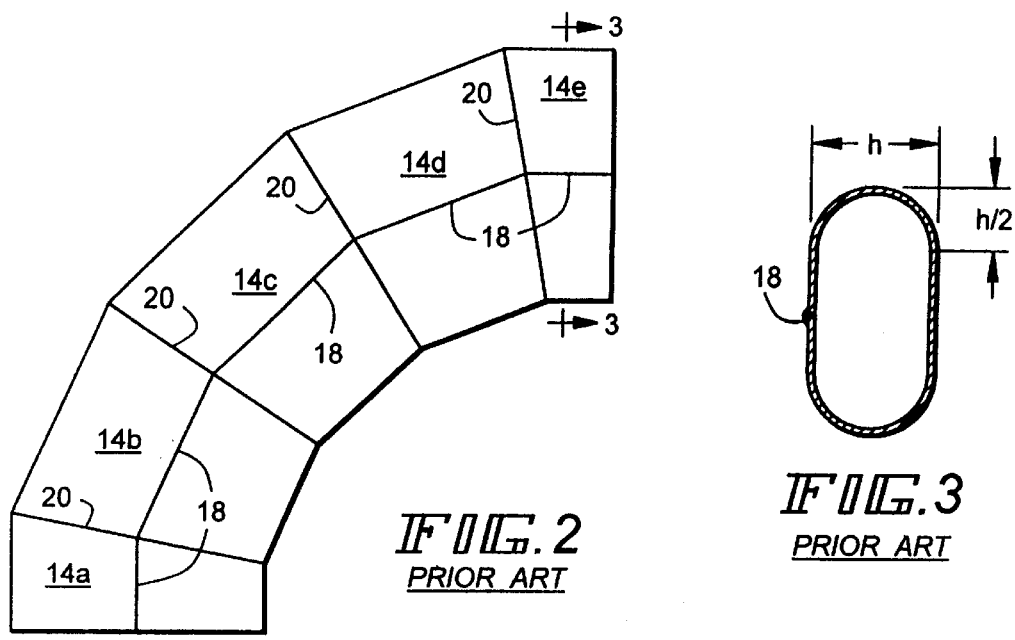
FIG. 2 PRIOR ART
FIG. 3 PRIOR ART
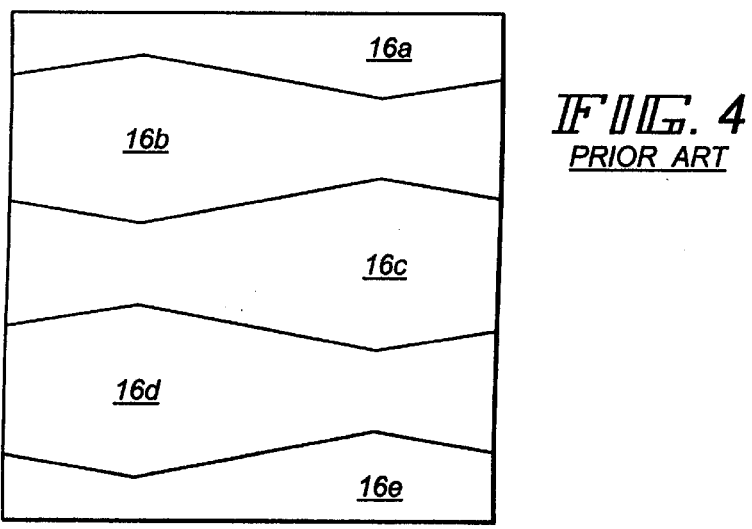
FIG. 4 PRIOR ART

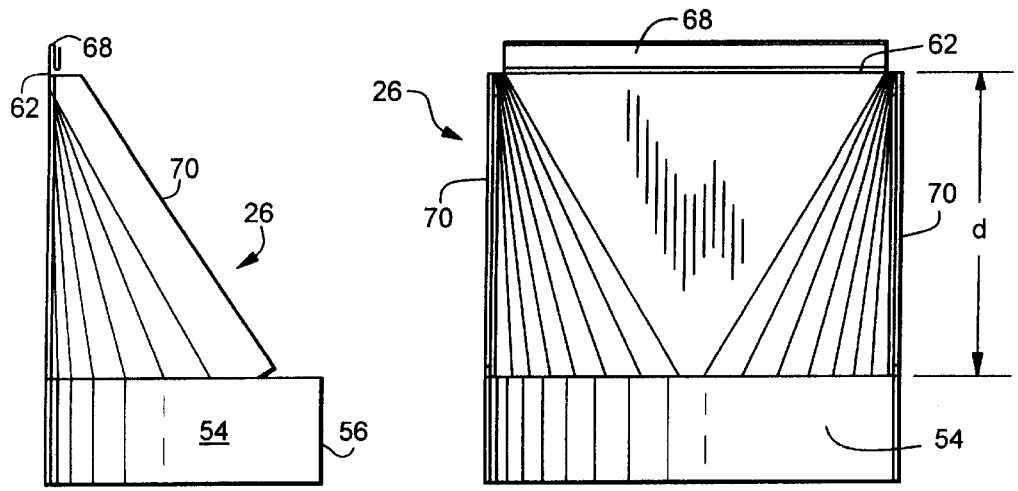
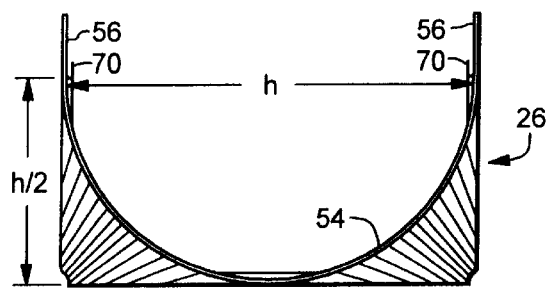
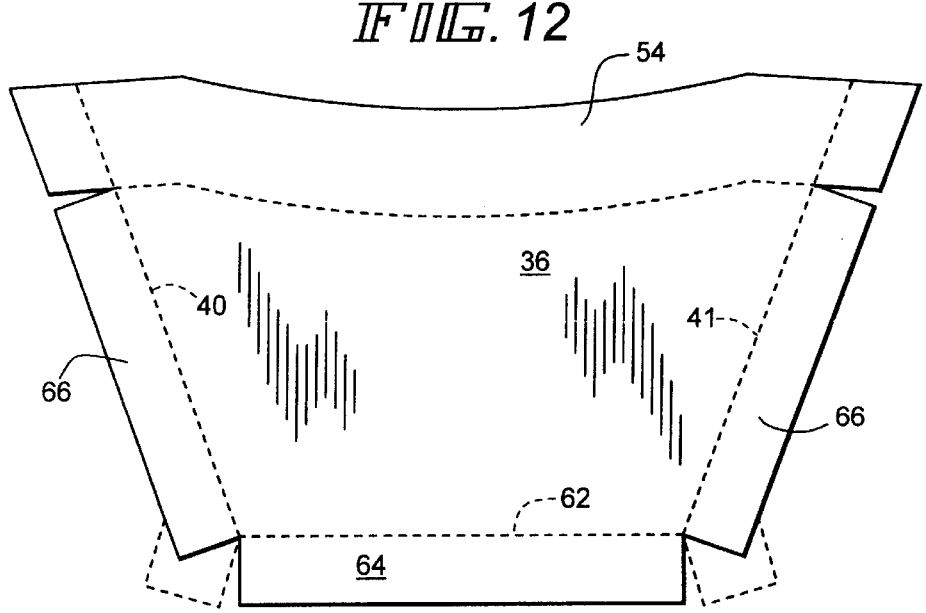

OTANGULAR FITTING FAMILY FOR FLAT-OVAL DUCT SYSTEMS AND METHOD FOR MAKING SAME

This application is a continuation, of application Ser. No. 532,388 filed Sep. 22, 1995, which is a continuation of Ser. No. 369,281 filed Jan. 6, 1995, which is a continuation of application Ser. No. 081,514 filed on Jun. 21, 1993 all now abandoned.

BACKGROUND OF THE INVENTION

The present invention relates to the field of heating, ventilating and air conditioning ("HVAC") and, more particularly, to sheet metal ducting used to channel air within a building structure thereby to effect the heating and cooling thereof.

Many factors must be balanced when selecting the type and sizing of duct for a particular building installation. One principal factor is the volume of air that must be delivered and the pressure at which such delivery shall be made. But other issues are of substantially equal importance including, for example, the physical space limitations within the available ceiling drops, walls, and riser columns. In short, the duct must comport with the structural realities of the building which realities include making accommodation for the other utilities (e.g. electric, water, sewage) that must share the available volume.

Finally, although potentially at the top of the 'factors list', is cost. HVAC ducting is no exception to the law of nature which provides that 'that which works the best, costs the most' and that 'which doesn't cost, doesn't work'. Nature notwithstanding, the technology of the present invention 'bends' nature's law by combining the best in functionality within the confines of affordable fabrication.

The standard of the HVAC industry has been, and remains, the rectangular duct. The rectangular form has numerous advantages that frequently makes it the duct of choice. First, rectangular duct provides the greatest cross-sectional area (i.e. air carrying capacity) of any of the duct families for any given maximum width or height dimension. By reason of the limited size of most duct races, this is not a trivial consideration. Probably the single greatest feature of the rectangular duct family, however, is its simplicity, ease of manufacture and corresponding economy of its fittings. Virtually every conceivable transition and fitting can be fabricated in the rectangular format and done so inexpensively—often with only four pieces, which pieces may be computed and automatically cut from sheet metal stock (see, for example, U.S. Pat. No. 4,551,810 to Levine). Further, the edges of the several constituent pieces that define the fitting may be brake or machine-formed to create a Pittsburgh, snap-lock or similar seam whereby the fitting may be expeditiously assembled without resort to welding or similar time-consuming attachment measures.

For all of its advantages, rectangular duct has a few significant short-comings including, for instance, the short lengths of duct sections available and the relative complexity of manufacture of such straight sections. To appreciate these limitations it is necessary to remember that straight rectangular duct sections are conventionally fabricated from coil stock typically five feet in width. While straight sections of virtually any length could, in theory, be made simply by rolling out sufficient stock, only certain size ducts may be thus fabricated within the five foot width constraint without substantial sheet metal waste. Thus, straight sections are fabricated, not by uncoiling long lengths of sheet metal, but by forming the requisite component pieces by a series of transverse cuts. In this manner there is little waste, but the tradeoff is duct the maximum length of which is the width of the coil stock employed.

Circular and the so-called 'flat-oval' duct families solve the above straight-section length problem while, not surprisingly, introducing yet other problems. Circular duct is literally wound as a solid helix from a relatively narrow coil of about six inches in width. The diameter of the finished circular duct is that of the solid helix and may be any reasonable diameter. The advantage of this duct configuration is the absence of length restrictions such as found with rectangular duct, at least aside from the obvious practicalities of handling excessively long duct sections. Any length duct may be fabricated by continuing the helical winding process until the desired length is reached.

Circular duct, however, is the least efficient in terms of conveying air volume, at least when confronted with a finite space limitation—the usual situation. A circular duct must be as high as it is wide and therefore greater air carrying capacity cannot be achieved simply by making the duct wider. And it will be further appreciated that even to the extent of the available height dimension, circular duct 'fills' this full height only in the center thereof, leaving unused dead spaces in what would be the corners of a rectangular (square) duct of the same lineal cross-sectional dimension. Rectangular duct, by contrast, fills the full available height space across its entire width.

Flat-oval duct was developed to solve this inefficiency of circular duct while maintaining its simplicity of construction and length versatility. Indeed, one popular method for the manufacture of flat-oval duct is to first 'wind' a circular duct section, thereafter, to 'ovalize' it by placing it on a pair of mandrels which are, in turn, forced outwardly, transverse to the longitudinal duct axis, to form an oval or flattened circular duct. Flat-oval duct comes closer to approximating the air carrying capacity of rectangular duct while not, as noted, sacrificing the advantages obtained from circular duct.

But again, all is not perfect—with one attribute there appears always to be an offsetting detriment. And flat-oval is no exception. Fittings for flat-oval duct are considerably more difficult to manufacture than corresponding rectangular fittings. A typical flat-oval fitting is comprised of plural "gore" sections, each of which must be carefully formed into an oval contour from an irregularly-shaped cut-out. The continuously curved edges that define these gore sections renders the machine formation of seams difficult and expensive. Thus, typically, the resulting gore sections are welded.

As a consequence of this tortuous fabrication scenario, flat-oval has not attained the popularity that might otherwise have been anticipated and, to the extent used, it has been found that most contractors do not fabricate fittings 'in-house' as they do with rectangular duct but, instead, must obtain such fittings as purchased parts from outside vendors. This is not only more expensive, but the contractor looses control over fitting quality and delivery and cannot make last minute adjustments as may, for example, be required in response to unforeseen job site complications.

As noted above, the present invention seeks to revise the natural law that 'that which works best, costs most' by combining the best of the rectangular and flat-oval duct families in a manner that the beneficial attributes of each family are realized without the high cost ordinarily associated with such superlative performance.

More specifically, the present invention relates to a family of modified rectangular fittings, referred to herein as "otangular" fittings, which facilitates the interconnection of flat-oval duct with an ease and cost comparable to conventional rectangular fittings. It will be appreciated that this otangular technology fuses the essentially limitless length capability of flat-oval straight-sections with the ease of manufacture and corresponding cost efficaciousness of rectangular fittings.

Otangular fittings have other advantages as well. For example, certain transitions and fittings virtually unheard of in flat-oval duct systems (e.g. a drop cheek elbow) is as easily fabricated using otangular technology as it would be employing a conventional rectangular fitting. Yet another advantage of otangular fittings is the ability to fabricate mixed fittings which mate rectangular duct, on one end, to flat-oval, on the other end.

The beauty of otangular technology is its ease of implementation wherein modified rectangular fittings are combined with—what will become 'off-the-shelf' "oval-corners"—to complete the fitting. As noted, most rectangular fittings are fabricated using automated machinery in which the shapes of the various flat sheet metal pieces required for the subject fitting are automatically computed, oriented or "nested" on sheet or coil stock, and cut therefrom. Automated machinery is again employed, this time to form seams along appropriate edges as required to assemble the completed fitting. This consummate ease of automated, machine-based fabrication represents an important advantage of rectangular duct technology—an advantage that can now be extended to flat-oval systems through the present otangular family of fittings.

And it cannot be overlooked that the cost of such automated machinery has fallen to where most HVAC installation shops can now afford to own and operate the equipment themselves. They can, in short, control their own fabrication schedules, make changes are required, and reap the profits from their manufacture or pass the savings to the customer as, frankly, may be required to remain competitive.

Otangular fittings are similarly suited for manufacture in small and large HVAC shops alike utilizing existing automated HVAC layout and seam-forming equipment. The initial fabrication process will be substantially identical to that now employed except that the computerized software shape determination, nesting, and cutting routines will be slightly modified, as outlined in more detail herein, to reflect the otangular duct configuration, in particular, the interface with the above-mentioned oval-corner pieces, a pair of which is required at each fitting interface to effect an interface to conventional flat-oval duct.

Fabrication routines for standard rectangular fittings generally require modification only to the extent of, first, forming the ends of the two parallel sides that define the 'major axis' of the fitting inlet/outlet to thereby create a tapered trapazoidal end region having, on the respective outside edges thereof, a predetermined taper angle and, second, dimensioning the remaining two sides (that define the 'minor axis') such that the ends thereof coincide with the inside end of the above-noted taper angle whereby two oval-corner receiving regions are defined on each end of the otangular fitting.

It is important to note that this basic modified rectangular fitting includes nothing not otherwise required to fabricate a conventional fitting of rectangular form, in particular, there are no special angles, bends or additional members—often just four pieces, as in a conventional fitting assembled using conventional seams and construction techniques. As thus assembled—and without inclusion of the oval-corners discussed hereinafter—the completed modified duct looks very similar to that of its unmodified rectangular counterpart except that the inlets and outlets thereof, as described above, have opposed recesses adapted to receive the requisite pairs of oval-corner components.

As outlined hereinafter, the fabrication of otangular fittings employing attachable oval-corner members offers several important advantages and is therefore the preferred approach. For instance, while it may initially appear that the number of duct sizes is virtually limitless, in reality there are only a relatively few "families" of flat-oval duct. As used herein, a duct "family" refers to all duct sizes having a given minor axis dimension, thus, for example, the 12" family would include the following flat-oval ducts: 12"×18", 12"×24", 12"×36", 12"×48" etc. It is significant to the efficacy of the present invention that all members of any given duct family may be fabricated using the same oval-corner member. And for this reason it will be appreciated that implementation of the full range of otangular fittings—and, implicitly, the full range of flat-oval duct sizes—requires only a few standard oval corner designs.

Herein lies one of the principal advantages of the otangular system of flat-oval fittings. The relatively few standard sizes of oval-corners can be tooled and stamped out in large, production quantities and sold, very inexpensively, as 'purchased items' to individual contractors. The comparatively few sizes required coupled with the economies of high volume, tooled production suggests that most contractors will choose to purchase and stock their oval-corner requirements as opposed to the in-house manufacture thereof.

In this manner the labor-intensive steps in fabricating an otangular fitting—i.e. the multiple sheet metal bends necessary to approximate the circular contour of the flat-oval duct—are completely eliminated and replaced, instead, by the simplist of installations of the purchased and inexpensive oval-corner members.

BRIEF DESCRIPTION OF THE DRAWINGS

FIGS. 1a, 1b and 1c depict a cross-sectional view of conventional rectangular, round, and flat-oval ducts each shown with the same minor axis dimension;

FIG. 2 is a horizontal view of a typical flat-oval elbow of conventional design having five gore sections therein;

FIG. 3 is a sectional view of the flat-oval elbow of FIG. 2 taken along line 3—3 of FIG. 2;

FIG. 4 is a horizontal view of the sheet metal scribed so as to produce the gore sections of FIG. 2 wherein the irregular and curved shapes of the several constituent gore sections is clearly visible;

FIG. 9 is a right elevation view of the oval-corner of the type shown installed on the otangular elbow in FIG. 5;

FIG. 10 is a front elevation view of the oval-corner of the type shown installed on the otangular elbow in FIG. 5; and, FIG. 11 is a horizontal view of the oval-corner of the type shown installed on the otangular elbow in FIG. 5.

FIG. 12 is a horizontal view of the sheet metal required to fabricate the oval-corner shown in FIG. 5.

DESCRIPTION OF THE PREFERRED EMBODIMENT

Figure 5:
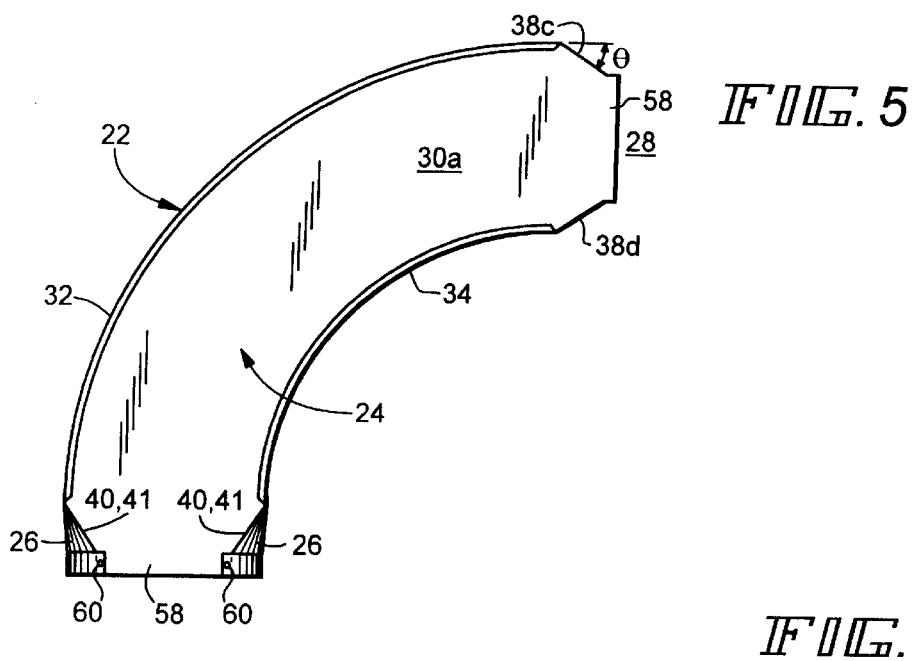
FIG. 5 is a horizontal view of an otangular elbow fitting of the present invention shown fully assembled with the oval-corners on one inlet/outlet opening and shown as initially assembled without the oval-corners on the other inlet/outlet opening.
Figure 7:
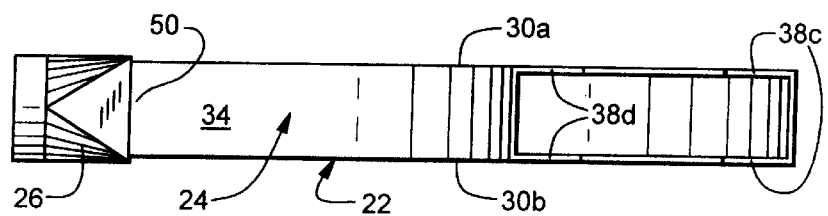
FIG. 7 is a side elevation view of the otangular elbow of FIG. 5.
Figure 6:
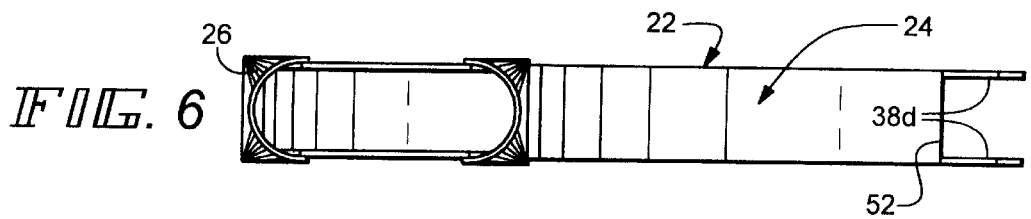
FIG. 6 is a front elevation view of the otangular elbow of FIG. 5.

FIG. 1 illustrates three standard duct family cross-sections including rectangular, round or circular, and flat-oval. As noted, space restrictions frequently limit the maximum lineal dimension of the duct, particularly in one direction, and therefore the exemplary ducts are all shown with the same minor axis dimension h to permit comparison of their respective air-carrying capacities. It will immediately be apparent from FIG. 1 why the round duct, despite its manufacturing advantages, is not the duct of choice in high air-volume, tight-spaced environments. For a given minor axis dimension (and air pressure), a rectangular or flat-oval duct can carry two, three or more times the air volume.

The otangular fitting topology of the present invention takes advantage of an important attribute of the flat-oval duct, also revealed by FIG. 1, namely, that regardless of the overall width w of the duct (i.e. the major axis dimension), the opposed ends 10 and 12 do not, for any given minor axis dimension h, change in either contour or size. That is, regardless of the width, both ends will be of semi-circular cross-section and defined on a radius of h/2.

Finally, FIG. 1 demonstrates that the air carrying capacity of flat-oval duct closely approximates that of rectangular duct, particularly as the duct aspect ratio increases (i.e. for larger ratios of w/h). Thus, flat-oval represents a generally acceptable substitute for rectangular duct on an 'air-volume verses physical-size' basis. And, as noted, flat-oval offers the additional advantage of spiral (helical) fabrication without the length restrictions common to the rectangular alternative.

FIGS. 2–4, however, make is clear why the HVAC industry has not overwhelmingly embraced the flat-oval duct—the required fittings are, to be kind, tortuous and therefore expensive to manufacture. These figures depict what, in the rectangular domain, would have been a straightforward, simple 90 degree elbow fabricated from four easily computed, sheared and assembled pieces. (See, for comparison, FIG. 8 in which the basic otangular elbow is defined by four conventionally-shaped, easy-to-fabricate pieces (excluding the oval-corner members 36 discussed below)).

But the flat-oval elbow of FIG. 2 is not an easy fitting to fabricate. Typically, it requires five gore sections 14a–14e, which sections, as is evident from FIG. 4, are defined in the first instance by sheet metal pieces 16a–16e having complex, compound curves. Once severed, each of these five pieces must be formed into its respective irregular oval shape and generally welded at 18 to form the individual gore section. And due to the fact that the edges of the individual gore sections are curved, (until formed into their irregular oval shapes), machine-formed seams, they are, at best, difficult to fabricate. Thus the five gore pieces are typically joined, again by welding at 20, to complete the flat-oval corner. It hardly requires comment that such tedium makes the fabrication of these fittings impractical for most shops and, at the very least, expensive.

By comparison, and as more fully described hereinafter, the otangular fittings of the present invention may be fabricated practically as effortlessly and inexpensively as conventional rectangular fittings thereby permitting use of flat-oval straight sections virtually 'at will' and without the cost penalty previously associated therewith.

FIGS. 5–8 illustrate the equivalent otangular 90 degree elbow 22 that functionally replaces the flat-oval elbow of FIGS. 2–4. More specifically, otangular elbow 22 is comprised of a modified rectangular fitting 24 having a pair of oval-corners 26 affixed to each inlet end thereof. The oval-corners 26 have been removed from one inlet end 28 of the otangular elbow (FIGS. 5–7) to expose and better show details of the modified rectangular fitting 24.

Figure 8:
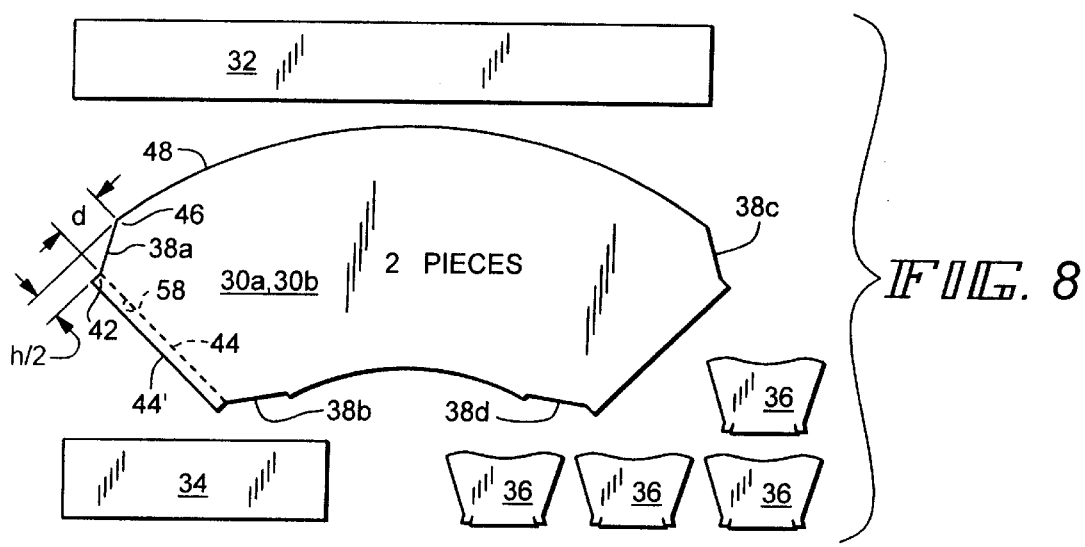
FIG. 8 is a horizontal view of the sheet metal scribed so as to produce the basic otangular elbow fitting of FIG. 5 including the oval-corners.

The simplicity of the otangular elbow is best understood by a review of FIG. 8 in which it can be seen that that otangular elbow, like its rectangular cousin, is comprised of two flat "cheeks" 30a,b, and outer and inner "wrappers" 32 and 34, respectively. Although the patterns 36 for the requisite oval-corners are shown, it is contemplated, and is indeed a feature of the present architecture, that such members will be available as standard, high-volume, prefabricated stamped parts and, consequently, that shops will not ordinarily layout nor manufacture these corners.

Cheeks 30a,b are contoured substantially the same as their rectangular counterparts except that the end corners thereof are tapered at 38a–d to facilitate mating with the complementary edges 40,1 (FIG. 5) of oval-corners 26. It should again be emphasized that a significant feature of otangular fitting technology is its inherent flexibility to additionally effect transition between flat-oval and rectangular duct sections simply by omitting the oval-corner tapers 38 from one end of each of the cheeks 30a,b (and by appropriately redimensioning the lengths of wrappers 32 and 34). Thus, for example, by removing tapers 38c,d from the otangular fitting of FIGS. 5–8, a 90 degree flat-oval to rectangular elbow results.

Any taper angle Θ (FIG. 5) may be employed although industry standards generally dictate angles in the order of 45° and 60° for converging and diverging transitions respectively. The actual dimensions of the triangular cut-out required to form the taper, in turn to receive the oval-corner 26, are calculated, in the first instance, by reference to the minor axis of the mating flat-oval duct. More specifically, and by reference to FIG. 3 for example, it will be apparent that the opposed ends of the flat-oval contour are defined by semi-circles of radius h/2. Consequently, taper 38 commences from a point 42 spaced h/2 inwardly along the effective inlet edge 44 of the cheek 30 (FIG. 8) to a second point 46 spaced d longitudinally along the outer (or inner) cheek edge 48. Distance d will be equal to h/2 for a 45° taper and to 0.866 h for a 60° taper. It will be understood that the absolute fitting edge 44' will be extended outwardly from the effective edge 44 as required to define a collar 58 required for a slip or similar conventional joint.

Referring again to FIG. 8, wrappers 32 and 34 are substantially equivalent to the corresponding rectangular fitting counterparts except that the lengths thereof are foreshortened as required so that the wrappers do not overlap nor interfere with the positioning of the oval-corners. Lines 50 and 52 (FIGS. 6 and 7) illustrate the respective ends of wrapper 34 and, more particularly, the engagement of the oval corners thereto.

FIGS. 9–11 illustrate the oval-corner 26 of the present invention while FIG. 12 depicts the flat sheet metal 36 required to fabricate such an oval-corner. It must again be emphasized, however, that one of the principal features of the present invention relates to the fact that, by reason that otangular fittings require but one size oval-corner for each duct family (i.e. duct of common minor axis dimension), it is not contemplated that most shops will seek to fabricate their own oval-corners. Rather, due to the high volume and relatively few sizes required, oval-corners will preferably be tooled and stamped, being available to the HVAC shops as inexpensive purchased items. Simply restated, the beauty of otangular technology, and in particular of the oval-corner, is the ability to effectively shift and lump all of the complex layout and fabrication problems ordinarily associated with any rectangular-to-circular interface to the oval-corner—a piece that, as noted, can be inexpensively mass-produced.

Thus, one end of the oval-corner—the end that mates with the flat-oval duct (not shown)—is formed as a semi-circle of radius equal to one-half the minor axis dimension h/2 of the flat-oval duct and generally includes a collar 54 to effect a slip-joint mating to the adjoining flat-oval duct. The distal ends 56 of the collar overlap the corresponding collar regions 58 of the cheeks 30 (FIG. 5) and serve as mounting tabs through which sheet metal screws 60 or similar means may be employed to rigidly affix the oval-corner 26 to the modified rectangular fitting 24. Such attachment functions in concert with the joints along edges 40,1 and 50,2, discussed hereinafter, to positively retain the oval-corner.

The flat-oval corner 26 defines a gradual transition from its semi-circular contour at 54 to three straight edges 40, 41, and 50. Additional sheet material 64 and 66 (FIG. 12) is provided along each edge and is formed into conventional slip joints 68 and 70 that engage three sides of the modified rectangular fitting, e g. the inner wrapper 34 (at 50, FIG. 7) and the top and bottom cheeks 30*a,b* (at taper 38, FIG. 8). Joints 68 and 70 may be machined-formed on the tooled, stamped oval-corner 26 and the completed corner positioned and attached to the fitting as described. Sealant may be applied to the joints as required.

It is claimed:

1. Rectangular fitting apparatus for flat-oval HVAC ducting including a conventional rectangular HVAC fitting having at least two air inlet ports of generally rectangular cross-section therein and converting means for adapting at least one of said ports from rectangular to flat-oval cross-section whereby flat-oval ducts may be connected thereto; the conventional rectangular fitting including at least one sheet metal member formed to define air passage means of generally rectangular cross-section between said air inlet ports; each of said air inlet ports being defined by respective first and second pairs of parallel edges of the rectangular air passage; the converting means for adapting a rectangular port to the flat-oval port including a pair of arcuate members, each arcuate member defining a semi-circular edge thereon, and recesses formed in said first and portions of said second pairs of parallel edges for receiving the arcuate members whereby the semi-circular edges of the arcuate members and the non-recessed portions of the second pair of parallel edges define a flat-oval air inlet port whereby flat-oval HVAC fittings may be fabricated from substantially conventional rectangular fittings.

2. The fitting apparatus of claim 1 wherein the arcuate members are three-dimensional and fabricated from sheet metal stock, each arcuate member defines a non-planar surface contour having a closed perimeter therearound, the closed perimeter comprising said semi-circular edge and three straight edges defined, respectively, as an opposed edge and pair of sloped edges, each of said edges having first and second ends; the semi-circular edge defining a plane, the opposed edge being spaced from said plane, the sloped edges defined respectively between the ends of the semi-circular and opposed edges thereby completing the closed perimeter, the radius of the semi-circular edge being equal to one-half the distance between the second pair of parallel edges and the length of the opposed edge being substantially equal to said distance whereby upon attachment of the arcuate member to said recess each of said straight edges is defined within respective three adjacent sides of the rectangular cross-section of the rectangular fitting apparatus whereby the rectangular cross-section is converted into a flat-oval inlet means cross-section.

3. The fitting apparatus of claim 2 in which the non-planar surface contour of the arcuate members is defined by at least three bends, including a continuous bending contour defined by a plurality of bends; said bends being fabricated by die stamping the oval-corner whereby said corners may be inexpensively mass-fabricated.

\* \* \* \* \*